(12) United States Patent
Schultes et al.

(10) Patent No.: US 8,198,978 B2
(45) Date of Patent: Jun. 12, 2012

(54) FILM RESISTOR WITH A CONSTANT TEMPERATURE COEFFICIENT AND PRODUCTION OF A FILM RESISTOR OF THIS TYPE

(75) Inventors: Günther Schultes, Saarbrücken (DE); Dirk Göttel, Wallerfangen (DE); Ralf Koppert, Salzgitter (DE); Olivia Freitag-Weber, Schawlbach (DE); Ulf Werner, St. Ingbert (DE); Wolfgang Brode, Hermsdorf (DE)

(73) Assignees: Hochschule fur Technik und Wirtschaft des Sarlandes, Saarbrücken (DE); Siegert Thinfilm Technology GmbH, Hermsdorf (DE)

( * ) Notice: Subject to any disclaimer, the term of this patent is extended or adjusted under 35 U.S.C. 154(b) by 44 days.

(21) Appl. No.: 12/736,573

(22) PCT Filed: Apr. 6, 2009

(86) PCT No.: PCT/EP2009/002530
§ 371 (c)(1),
(2), (4) Date: Dec. 27, 2010

(87) PCT Pub. No.: WO2009/129930
PCT Pub. Date: Oct. 29, 2009

(65) Prior Publication Data
US 2011/0102127 A1    May 5, 2011

(30) Foreign Application Priority Data

Apr. 24, 2008  (DE) .................. 10 2008 022 607
Mar. 5, 2009   (DE) .................. 10 2009 011 353

(51) Int. Cl.
*H01C 8/00*        (2006.01)
(52) U.S. Cl. ....... 338/223; 338/22 R; 338/306; 428/688; 29/620

(58) Field of Classification Search .................. 338/223, 338/225, 22 R, 13, 306, 334; 252/518, 520, 252/506; 428/688, 689, 697; 29/620, 610.1
See application file for complete search history.

(56) References Cited

U.S. PATENT DOCUMENTS
5,367,285 A    11/1994 Swinehart
(Continued)

FOREIGN PATENT DOCUMENTS
DE    35 22 427 A1    2/1986
(Continued)

OTHER PUBLICATIONS

Schultes and Freitag-Weber, Piedüs: Piezoresistive Dünnfilm-Sensorschichten für erhöhte Temperaturen, 2003, 6 pages.

*Primary Examiner* — Kyung Lee
(74) *Attorney, Agent, or Firm* — Roylance, Abrams, Berdo & Goodman L.L.P.

(57) ABSTRACT

The invention relates to a film resistor (1) comprising a carbon-containing material (3) into which clusters (4) of conductive cluster material are introduced, wherein the conductive cluster material has a positive temperature coefficient. The clusters (4) are surrounded by a graphite casing and embedded in the carbon-containing material (3). Furthermore, the cluster material is present in a thermodynamically stable phase. The invention also relates to a method for producing a film resistor (1), wherein a PVD process is carried out on a carrier substrate (11) using a sputtering material under a reactive atmosphere of a carbon-containing gas, and therefore the carbon-containing gas is dissociated and a carbon-containing layer (3) is deposited on the carrier substrate (11), with clusters (4) of the sputtering material being embedded in said carbon-containing layer, wherein the carbon-containing layer (3) is heated to a predetermined temperature while the PVD process is carried out, with the sputtering material or a compound of the sputtering material forming in a stable phase at said temperature.

15 Claims, 4 Drawing Sheets

U.S. PATENT DOCUMENTS

| | | | |
|---|---|---|---|
| 5,414,403 A * | 5/1995 | Greuter et al. | 338/22 R |
| 5,677,070 A | 10/1997 | Dimigen et al. | |
| 5,986,536 A * | 11/1999 | Ries et al. | 338/13 |
| 7,880,582 B2 * | 2/2011 | Tepper et al. | 338/115 |

FOREIGN PATENT DOCUMENTS

| | | |
|---|---|---|
| DE | 199 54 164 A1 | 6/2001 |
| DE | 10 2004 013 305 A1 | 9/2005 |
| DE | 10 2006 019 942 A1 | 10/2007 |
| EP | 0 575 003 A2 | 12/1993 |
| JP | 10270203 A | 10/1998 |
| JP | 2002008904 A | 1/2002 |
| JP | 2006024863 A | 1/2006 |

* cited by examiner

FILM RESISTOR WITH A CONSTANT TEMPERATURE COEFFICIENT AND PRODUCTION OF A FILM RESISTOR OF THIS TYPE

TECHNICAL FIELD

The invention relates to a film resistor comprising a film made of a carbon-containing material, in particular diamond-like carbon, graphite-like carbon, and the like, into which conductive material is introduced.

BACKGROUND ART

Precision resistors are used in many fields of application in electrical engineering and are well-known from the prior art. Precision resistors are usually produced by means of metal films of defined length and cross-sectional area. The current trend is to use predominantly metal films composed of nickel-chromium compounds or constantan. One drawback with a precision resistor made of a metal film lies in its significantly nonlinear, in particular parabolic, temperature dependence, which in general all alloys and metal exhibit.

Especially when nickel-chromium compounds are used for precision resistors, the electrical resistance also shows a dependence on the selected cooling rate during the production process, so that in limited temperature ranges a different temperature dependence of the electrical resistance can be achieved as a function of the production conditions. However, by applying defined annealing steps and cooling periods after the temperature treatments, it is possible in the case of such metal films to adjust the temperature coefficient of resistance to almost zero in a limited temperature range. While such metal film resistors can be assumed to be approximately temperature constant in the limited temperature range, they are, however, not useful as precision resistors over a wide temperature range, especially at temperatures below 200 K or at temperatures above 400 K.

Furthermore, it is known that carbon-containing films can be used as the resistive material. These materials exhibit a temperature coefficient of ±100 ppm/K in a limited temperature range and usually a high specific resistance of more than 1,000 $\mu\Omega\cdot$cm.

Coatings based on amorphous carbon a-C or hydrocarbon a-C:H respectively are sufficiently well-known from the prior art and are used primarily to reduce wear. Thus, DE 10 2006 029 415 and DE 10 2006 027 502 show suitable tribological functional layers, which reduce the friction and simultaneously increase the wear resistance of machine components.

It is also known that the electrical properties of carbon-containing films, in particular a-C:H films, can be significantly affected by the incorporation of metals. Thus, the German document DE 109 54 164 A1 proposes in order to adjust the ohmic resistance of carbon-containing films that the carbon-containing film be doped with a metal material, in order to suitably reduce the resistance. These thin films can be produced in a combined PVD/CVD [physical vapor deposition/chemical vapor deposition] process by sputtering from a target material, using an additionally introduced carbon-containing reactive gas. The result is the formation of metal clusters in a carbon matrix and/or hydrocarbon matrix that cannot be specified in detail.

Document EP 05 75 003 A2 also discloses a carbon-containing film that contains metal, the film being configured in such a way that no carbide forms between the metal and the carbon.

However, it has been observed that in the case of metal-containing amorphous hydrocarbons, in which the doping material contains, for example, one of the metals Ag, Au, Cu, Pt, or Pd, the temperature coefficients are unstable over a wide temperature range; that is, they change permanently, so that such a material is not suitable as a resistive material having defined and/or constant temperature coefficients.

Owing to the temperature dependence of their resistance, resistive films comprising a carbon-containing material are used, for example, as temperature sensors in stressed areas of machines. This feature is well known from document DE 102 53 178 A1, where a film of diamond-like carbon is used as a temperature sensor. However, the drawback in this case is the aforementioned nonlinear temperature dependence of the electrical resistance.

Similarly, the prior art discloses the piezo-resistive behavior of carbon in hydrocarbon films, because of which they are used as piezo-actuators or piezo-sensors. Hence, DE 10 2006 019 942 shows systems with amorphous carbon films, which exhibit piezo-resistive properties that can be used for measuring forces.

Owing to their piezo-resistive properties, the carbon-containing films have a high potential for sensor applications, such as for force or pressure sensors. While conventional strain gauges that are based on CrNi resistance structures exhibit a strain sensitivity in a range of a gauge factor (GF) approximately 2, which is caused by a geometric variation of the strain gauge, carbon-containing films, for example, amorphous carbon films, exhibit gauge factors in a range between 10 and 20. However, carbon-containing films also show, besides their piezo-resistive behavior, the above-described strong temperature dependence of their electrical resistance. Such a temperature dependence is disadvantageous when the piezo-resistive property of a carbon-containing film is used, for example, as a force sensor, because variations in the ambient temperature can lead to force-independent variations in resistance and, thus, to a distortion of the measurement results.

The object of the present invention is to provide a film resistor that exhibits a linear temperature sensitivity of its electrical resistance over a wide temperature range. Furthermore, the object of the present invention is to provide a method for producing a film resistor of this type.

DISCLOSURE OF THE INVENTION

These objectives are achieved by the film resistor according to claim 1, by the method for selecting a cluster material for introducing into the carbon-containing material, and by the method for producing a film resistor according to the independent claims.

Additional advantageous embodiments are disclosed in the dependent claims.

A first aspect provides a film resistor comprising a carbon-containing material, into which clusters of conductive cluster material are introduced. The conductive cluster material exhibits a positive temperature coefficient, wherein the clusters, which are surrounded by a graphite shell, are embedded in the carbon-containing material. The cluster material is present in a thermodynamically stable phase, especially in the case of nickel in a cubic phase.

One idea of the present invention is to provide a film resistor that exhibits a constant temperature coefficient of resistance over a wide temperature range. In particular, the object of the invention is to be able to adjust with a very high degree of accuracy the temperature coefficient of resistance. To this end, the invention provides that the material for the film resistor has a carbon-containing film, such as amorphous carbon, diamond-like carbon, graphite-like carbon, or amorphous hydrocarbon, with clusters of a conductive material, where the clusters are surrounded by shells composed of one or more layers of graphene (graphene shells), which separate the clusters of conductive material from each other. It is provided that the cluster material is present in a phase that is especially temperature stable. That is, at high temperatures, for example, exceeding 300° C., there are no conversions and, thus, no change in the properties. This feature is guaranteed by embedding the material of the clusters in a thermodynamically stable phase into the carbon-containing material.

Furthermore, the above-described film resistor can also be used as a precision resistor at very low temperatures.

The film resistor, with the clusters that are surrounded by a graphite shell and which are embedded in the carbon-containing material, enables the production of a film resistor having an especially linear temperature dependence over a wide temperature range—between 50 and 500 K.

This constitutes a significant advantage over the precision resistors comprising alloys and metals because they exhibit a non-constant and non-linear temperature coefficient of resistance.

Furthermore, the proportion of cluster material can be selected below the percolation threshold for the cluster material so that total percolation of the clusters in the carbon-containing material cannot occur.

Furthermore, the carbon-containing material can exhibit a matrix with amorphous carbon or amorphous hydrocarbon.

According to one embodiment, the conductive cluster material can contain metal or a metal alloy, in particular nickel or a nickel alloy.

In particular, the proportion of cluster material in the carbon-containing film can be adjusted in such a way that the temperature coefficient of the film resistor is 0.

Another aspect is a method for selecting a conductive cluster material for clusters in the production of a film resistor according to claim 1 by forming the cluster by deposition in a PVD process under a reactive atmosphere with a carbon-containing gas. In this case, the cluster material is selected based on a predetermined desired temperature coefficient of resistance, in particular, a desired temperature coefficient of resistance equal to or greater than zero, so that a proportion of cluster material at which the desired temperature coefficient is obtained is below the percolation threshold.

Furthermore, a material that is chemically inert to air, water, or oil can be selected as the cluster material.

According to one embodiment, a material with which there is no diffusion motion of the clusters in the carbon-containing material can be selected as the cluster material.

Another aspect provides a method for producing a film resistor. The method comprises the following steps:
carrying out a PVD process with a sputtering material on a carrier substrate under a reactive atmosphere of a carbon-containing gas, so that the carbon-containing gas is disassociated and a carbon-containing film, in which clusters of sputtering material are embedded, is deposited on the carrier substrate, the carbon-containing film being heated to a predetermined temperature, at which the sputtering material or a compound of the sputtering material is produced in a stable phase.

The above method makes possible the production of such a carbon-containing material with embedded clusters of the cluster material in an especially efficient way, because during the deposition of the carbon-containing material with the embedded clusters, the cluster material is brought into a thermodynamically stable phase. This is achieved by an additional energy input onto the carrier substrate, on which the film resistor is applied. In this way, the film resistor can be produced in a single working step.

Furthermore, it can be provided that the carrier substrate is heated to a temperature between 150° C. and 400° C. Furthermore, the carbon-containing gas can have ethane or ethylene.

Furthermore, it can be provided that the concentration of carbon-containing gas determines the proportion of sputtering material in the carbon-containing film, the concentration of the carbon-containing gas being adjusted in such a way that the clusters of sputtering material in the carbon-containing film are separated from each other by the graphene films. In particular, the proportion of sputtering material can be selected in such a way that a predetermined temperature coefficient of resistance for the film resistor is obtained.

An additional aspect provides the use of the above film resistor as the sensor layer, where a strain-sensitive area is formed by the film resistor.

Another aspect provides a film resistor that can be produced by the above method.

BRIEF DESCRIPTION OF THE DRAWINGS

Preferred embodiments are explained in detail below with reference to the accompanying drawings.

DESCRIPTION OF EMBODIMENTS

Figure 1:
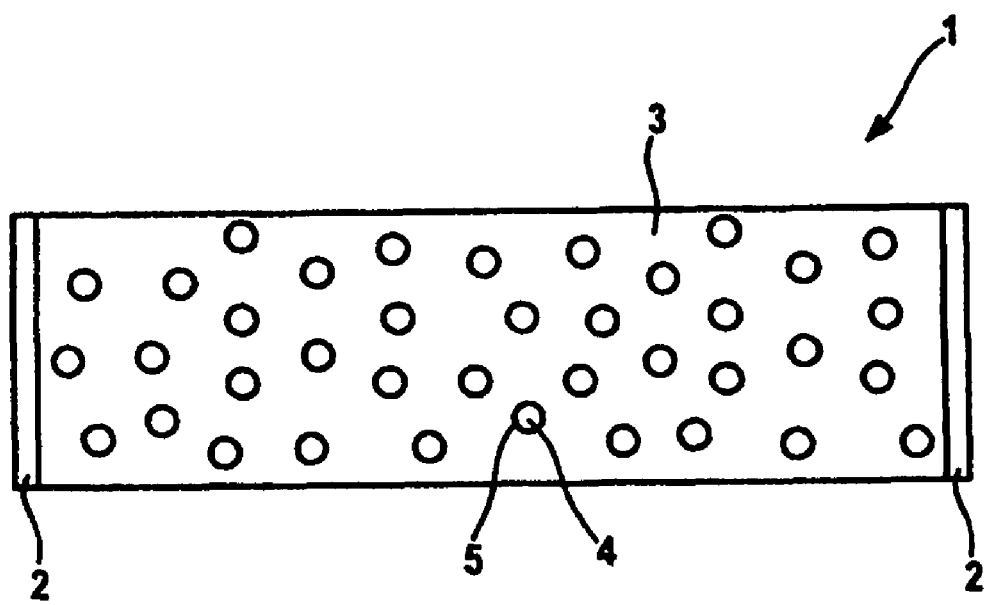
FIG. 1 is a cross-sectional view of a film resistor composed of carbon-containing material with embedded clusters of conductive material.

FIG. 1 is a cross-sectional view of a film resistor 1 that is arranged between two electrodes 2. To this end, the film resistor 1 serves to provide a defined electrical resistance between the two electrodes 2.

The film resistor 1 comprises a carbon-containing film 3 that corresponds preferably to diamond-like carbon, graphite-like carbon, amorphous carbon a-C, or amorphous hydrocarbon a-C:H. The carbon-containing material of the carbon-containing film 3 forms a so-called carbon matrix, into which the clusters 4 composed of a conductive cluster material X are embedded. The resulting films are referred to hereinafter as X:a-C or X:a-C:H respectively. The clusters 4 represent islands of cluster material or rather of a carbide of the cluster material in the carbon-containing film 3 and are uniformly distributed in the film material of the carbon-containing film 3.

In this respect, the clusters 4 are present in a preferably spherical shape and are surrounded by a carbon matrix of the carbon-containing film 3. Other shapes of the clusters 4 were also observed when the process parameters were varied during production, for example, elliptical and oblong clusters. The cluster material is embedded in the carbon-containing film 3. The conductive material of the clusters 4 preferably contains a metal or a metal alloy, with nickel, nickel alloys, nickel compounds, cobalt, cobalt alloys, cobalt compounds, iron, iron alloys, or iron alloys appearing to be suitable, and, in particular, nickel appearing to be especially suitable.

Figure 2:
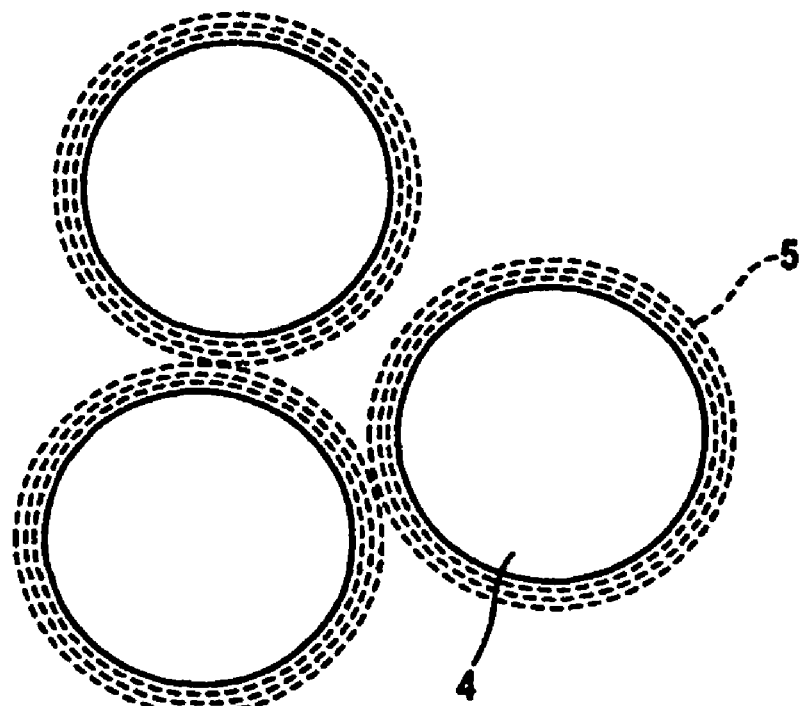
FIG. 2 is a schematic drawing of the clusters surrounded by graphene shells and their interaction.

The clusters 4, which form the cluster material, are surrounded by graphene shells 5 composed of several graphene films that are arranged in a curved manner around the clusters 4, as shown in detail in FIG. 2. Thus, one portion of the carbon matrix is present as the graphene planes surrounding the individual clusters. Graphene is a state of carbon, where the carbon atoms are bonded together so as to form a honeycomb, so that planar structures are formed. Thus, a graphene shell is a one-atom-thick film that is composed of carbon atoms that are arranged in a honeycomb structure and that surrounds the clusters 4. Graphene is a good conductor of electrical current along the planar elongation of the graphene film. A higher electrical resistance occurs when a current is conducted between two adjacent graphene films. The graphene shells 5 can prevent the clusters 4 from moving in the carbon-containing material 3 and, thus, a percolation of the clusters 4, which can result in the formation of a conductive path through the carbon-containing material 3. In other words, the graphene shells create a delimitation between the adjacent clusters 4, so that a percolation, that is, the formation of an electrically conducting path owing to a coalescence of the adjacent clusters 4 through the film resistor 1, is prevented.

If the proportion of cluster material chosen is too high, then the graphene shells between the clusters 4 cannot form undisturbed, so that percolation occurs and conductive paths through the film resistor 1 form. In this case, the determinative factor for the conductivity of the film resistor is the conductivity of the cluster material. The proportion (concentration) of cluster material at which conductive paths in the film material can form due to the coalescence of the adjacent clusters is referred to as the percolation threshold. Below the percolation threshold the conductivity of the film resistor is affected by other contributory factors.

Figure 3:
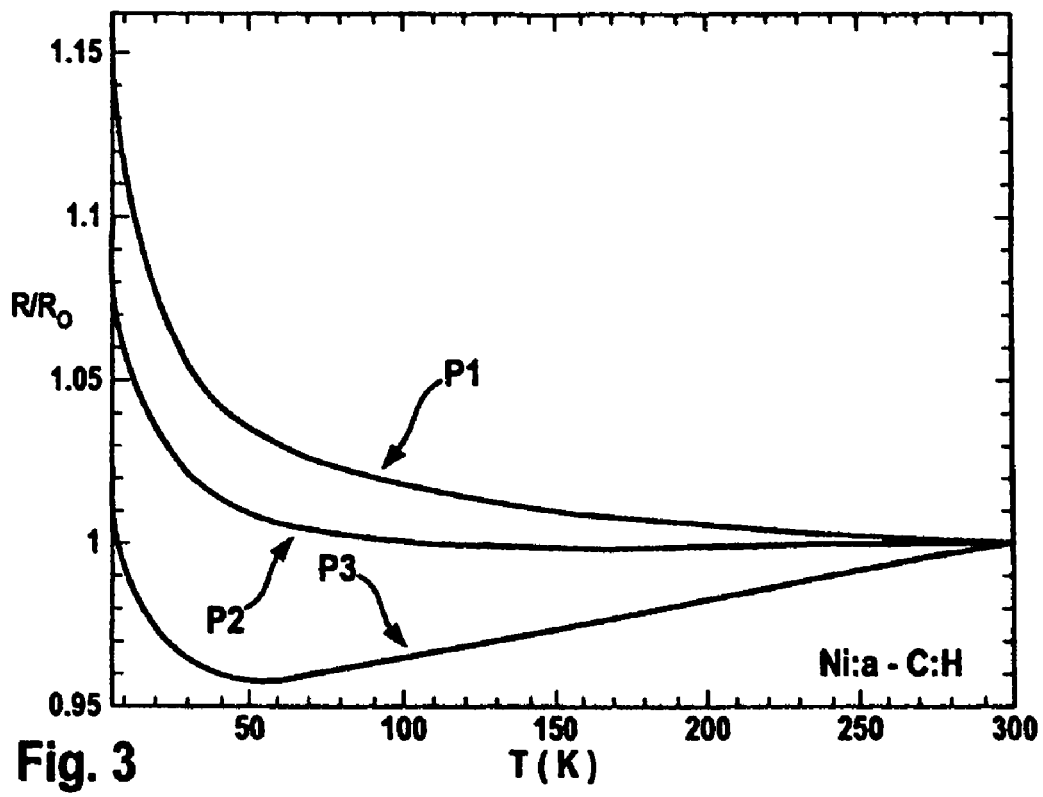
FIG. 3 shows a graph of the curve of the specific resistance over the temperature.
Figure 4:
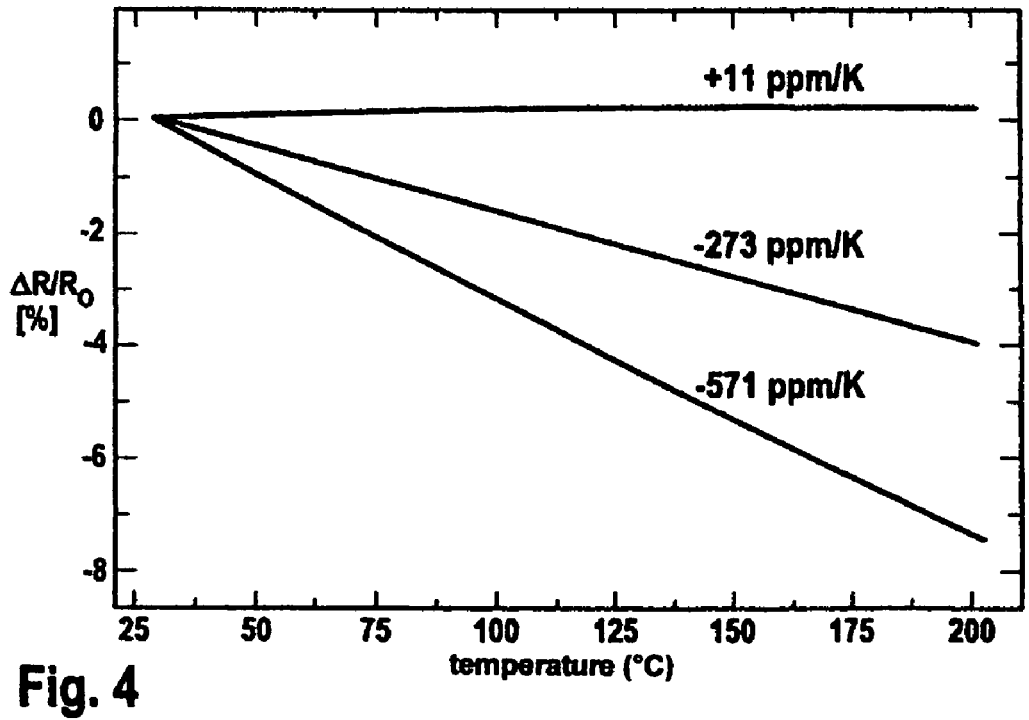
FIG. 4 shows another graph of the curve of the specific resistance over the temperature in a wider temperature range.

It is clear from FIGS. 3 and 4 that in the low temperature range below approximately 50 K, the conductivity is determined by the tunnel processes between the individual graphene planes around the clusters 4. These planes show an exponential dependence on the temperature. Above this temperature an unknown conduction mechanism develops that does not correspond to any of the known guiding mechanisms in thin film systems or their combination. This mechanism results in a linear dependence of the resistance on the temperature in a range between approximately 50 K and approximately 500 K. FIG. 3 shows the dependence of the electrical resistance on the temperature in a range between 4 K and 300 K of three different samples. The samples P1 exhibit a negative temperature coefficient of approximately −30 ppm/K; the samples P2 exhibit a temperature coefficient of almost 0; and the samples P3 have a positive temperature coefficient of approximately 80 ppm/K. Additional measurements have revealed that the curve of the temperature dependence of resistance runs approximately linearly up to approximately 500 K, as shown in FIG. 4.

In order to provide the film resistor 1 with a limited temperature coefficient, it is necessary to choose, as the conductive cluster material, a material having a positive temperature coefficient of electrical resistance. In this way, the highly negative temperature coefficient of resistance of the carbon-containing material 3 can be compensated by the positive temperature coefficient of resistance of the cluster material. Depending on the cluster material that is used and/or in the case of a metal as the cluster material, depending on the melting point of the metal that is used, the carbon-containing material 3 will exhibit different proportions of concentration of the cluster material.

In the case of nickel as the cluster material, the proportion is approximately 50 at % Ni, in order to compensate the temperature coefficient of resistance to approximately 0, provided that the clusters are spherical and have a size ranging from 5 to 50 nm, preferably from 10 to 20 nm.

An important condition for the linear temperature dependence is that when the material nickel is used as the cluster material, the nickel in the clusters is present in a thermodynamically stable phase. Depending on the production method, it can happen that nickel forms with carbon the metastable phase $Ni_3C$ or Ni (hexagonal). In a subsequent annealing process on exposure to air, this phase is converted, starting at approximately 525 K, slowly and uncontrollably into the thermodynamically stable cubic (fcc) phase, as a result of which the resistance of the resulting film resistor is permanently altered. This conversion also takes place at even lower temperatures over a longer period of time.

Figure 5:
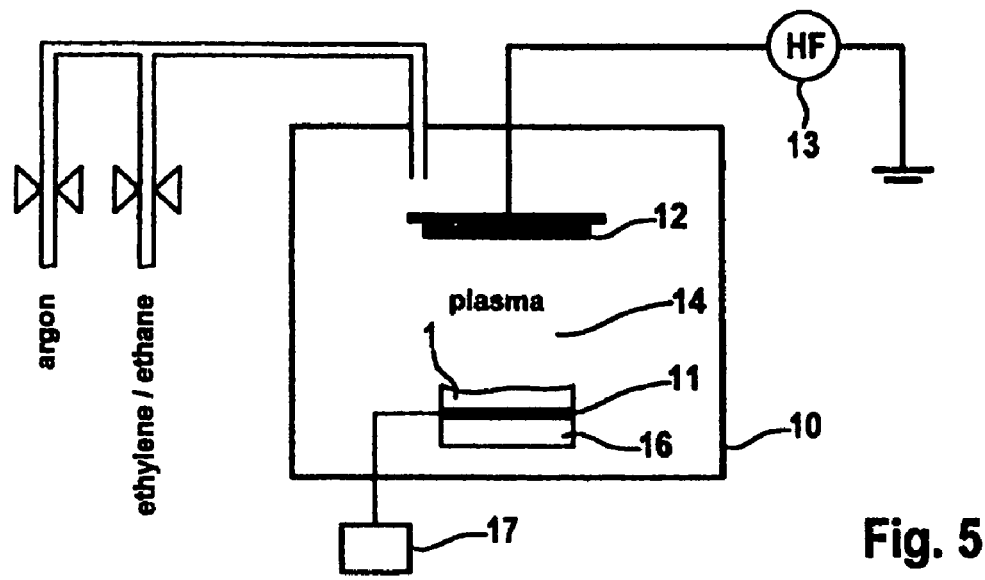
FIG. 5 shows a device for producing a film resistor.

FIG. 5 is a schematic drawing of a device for carrying out a method for producing the film material of the film resistor 1. In order to produce the carbon-containing film 3, a PVD process (sputtering process) sputters in a vacuum chamber 10 the sputtering material onto a carrier substrate 11, preferably a non-conducting ceramic material, for example, $Al_2O_3$, from a target 12 composed of the cluster material. This process takes place by means of reactive HF sputtering, where the target 12 is connected to a high frequency source 13. Between the carrier substrate 11 and the target 12, a plasma 14 is formed, by means of which the atoms of the target material are moved in the direction of the carrier substrate 11. The sputtering process is carried out under a protective gas atmosphere, using an inert gas, for example, argon. Furthermore, a carbon-containing reactive gas, such as ethylene or ethane, is introduced in a defined concentration, so that on forming the plasma 14, the disassociation induces the formation of carbon or hydrocarbon that settles together with the target material on the carrier substrate 11. This approach achieves the goal of a uniform distribution of the cluster material in the carbon film or hydrocarbon film respectively.

Figure 6:
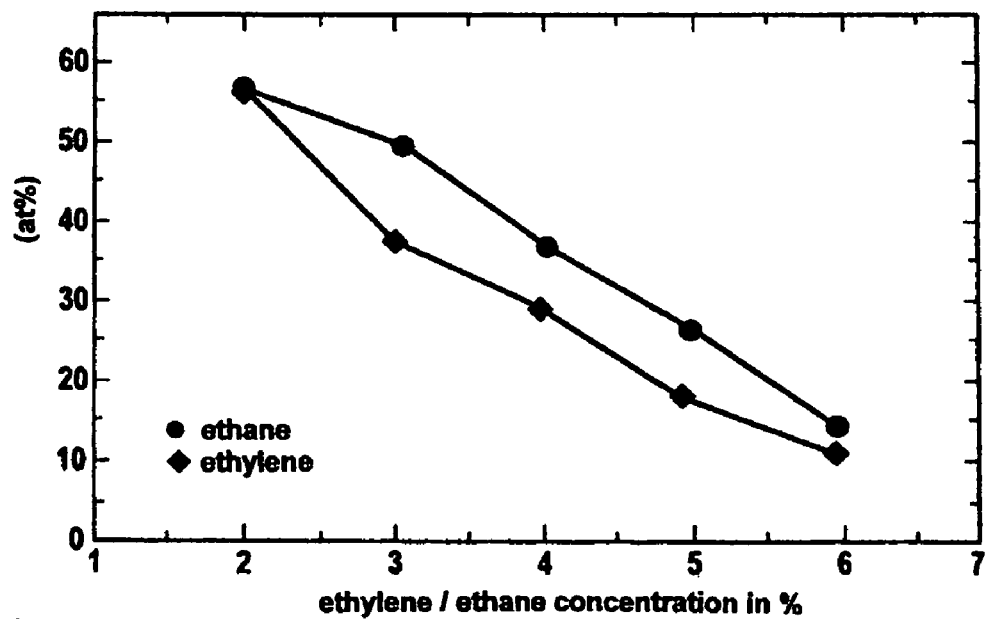
FIG. 6 is a diagram for depicting a dependence between the ethylene and/or ethane concentration in the inert gas in relation to the proportion of cluster material in the film resistor.

The concentration of the reactive gas in the protective gas determines the percentage of cluster material in the carbon-containing material 3 (shown in the diagram in FIG. 6). According to this diagram, the concentration of the target material in the carbon-containing film is a function of the concentration of the reactive gas during the deposition process (combined PVD/CVD process). With the aid of this diagram the desired proportion of target material can be adjusted during the production of the film by specifying the concentration of reactive gas.

During the production of a film resistor having a linear temperature dependence up to temperatures of 500 K, it must be ensured that the cluster material is present in a thermodynamically stable phase as early as during the production of the film material. That is, if nickel is used as the cluster material, then the nickel should be in a cubic (fcc) phase that is temperature stable. In this case, the subsequent temperature treatments no longer induce a phase change, so that the temperature dependence of the electrical resistance remains constant. To this end, it is provided that during the combined sputtering process, where both physically the cluster material and by chemical disassociation the carbon or hydrocarbon respectively are applied on the carrier substrate 11, the deposited film is heated to a process temperature. To this end, when nickel is the cluster material, the carrier substrate 11 is heated to a temperature between 200° C. and 400° C., preferably between 250° C. and 350° C., by means of a heating element 16, which is mounted on said carrier substrate, while the deposition process (PVD/CVD process) is being conducted.

Figure 7:
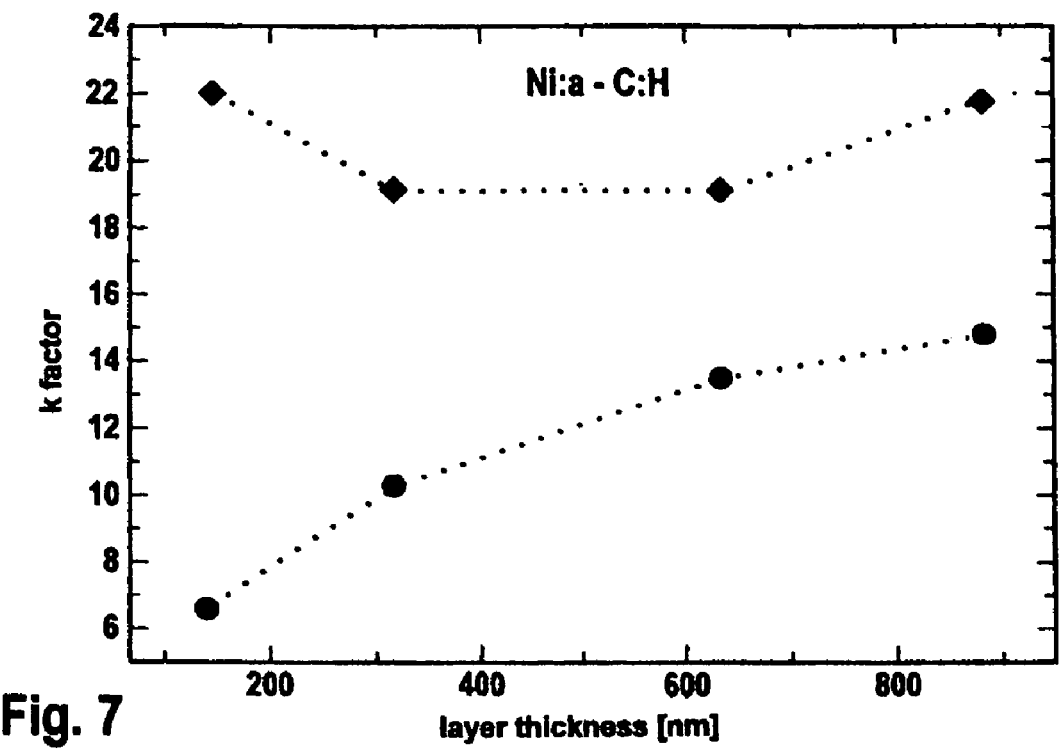
FIG. 7 is a diagram for depicting the dependence of the k factor of the layer thickness at different carrier substrate temperatures during the production of the film resistor.

FIG. 7 shows the change in the k factor for a variety of thicknesses of the film material and for nickel as the cluster material at temperatures from 100° C. to 300° C. It is clear that at a carrier substrate temperature of 300° C. the k factor is approximately constant for various film thicknesses, whereas this is not the case at lower temperatures.

The process temperature, at which a conversion occurs as early as during the deposition process of the carbon-containing film, is dependent on the embedded cluster material. Instead of nickel as the cluster material, it is also possible to provide other materials, preferably metals or metal alloys. In the case of other cluster materials, other process temperatures may be necessary. Then they are chosen in such a way that the cluster material is converted into a thermally stable or thermodynamically stable phase during or immediately after the deposition of the cluster material.

When cobalt is used as the sputtering material, it was found that cobalt is incorporated as cobalt carbide $Co_2C$ in the carbon-containing film. However, cobalt carbide $Co_2C$ is not temperature stable and is converted into a stable phase at temperatures between 240 and 250° C. For example, cobalt carbide $Co_2C$ reacts in the presence of hydrogen to form cobalt and methane $CH_4$. Thereafter, the cobalt is present in a thermodynamically stable orthorhombic phase. If the cobalt carbide $Co_2C$ is produced at other temperatures, it does not completely decompose at this temperature, but rather not until above 350° C., or then it decomposes completely at 620° C.

Another sputtering material that may be considered is, for example, also iron. In this case, iron carbide is embedded in the carbon-containing film. The iron carbide is temperature stable. Only at the eutectic temperature of 723° C. can perlite be produced from iron carbon. At 1,493° C. there is a peritectic conversion.

In addition, it is possible to provide an energy input by means of an HF bias sputtering in the form of an additional substrate bias voltage. In an HF bias sputtering process a high frequency voltage, provided by a bias high frequency source 17, is applied to the carrier substrate 11 and to the target material. As a result, not only is material stripped from the target 12, but at the same time also from the carrier substrate 11 or from the film applied thereon respectively.

Apart from the linear temperature dependence, the above film resistor exhibits a high strain sensitivity. Typically, k factors (gauge factor, change in resistance relative to strain $\epsilon$) $k=\Delta R/R/\epsilon$ of 20 are obtained. It is suspected that the high k factor is the effect of the graphene shells that serve as a barrier during electrical transport by charge carriers and, therefore, have to be overcome by the charge carriers. A mechanical strain, such as, for example, a direct pressure on the film resistor, among other contributory factors, changes the distance of the planes of the graphene shells, so that the electrical resistance can be affected very significantly. This state could result in a large change in resistance in the case of a strain and, thus, in a high k factor.

The cluster material can be selected according to a plurality of criteria, in order to obtain an adapted temperature coefficient of resistance (of 0 or positive or negative) in conjunction with a high k factor.

Figure 8:
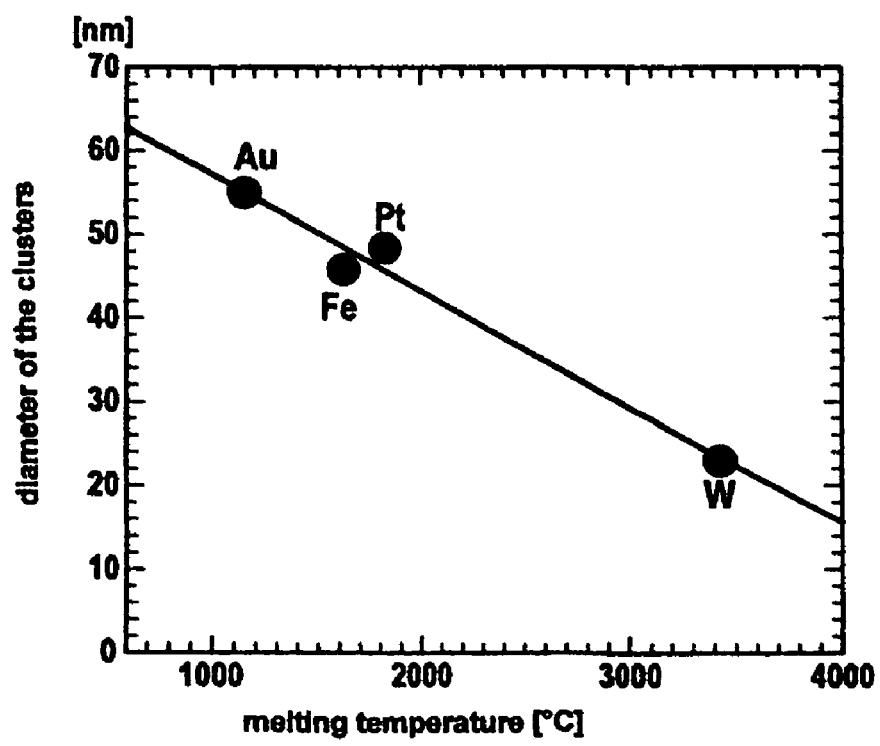
FIG. 8 is a diagram of the correlation between the melting temperature for the metals Au, Pt, Fe, and W and the cluster size in the case of the production method according to FIG. 5.

First of all, the size of the individual clusters determines the percolation threshold and the distance between the individual clusters. The cluster size depends on the melting point of the cluster material. Metal or metal alloys having a high melting point form smaller clusters than metals or metal alloys having a lower melting point. This state is depicted in the diagram of FIG. 8, which shows the correlation between the melting temperature for the metals Au, Pt, Fe, and W and the cluster size. If there are many small clusters with negligible spacing in the carbon-containing material, then the percolation threshold is lower than in the case of larger clusters. That is, just a low metal or metal alloy concentration yields a percolation, that is, the formation of conductive paths, in the carbon-containing material.

However, the concentration of cluster material in the carbon-containing material determines the extent to which the temperature coefficient of the film resistor, that is, the carbon-containing film material, can be shifted to a positive temperature coefficient.

In the case of tungsten that has a very high melting point (3,410° C.), very small clusters (in a range from 1 nm to 3 nm) are formed in the carbon-containing material. This results in a percolation threshold that is below 20 at % tungsten. However, merely to compensate for the negative temperature coefficient of the carbon-containing material, the tungsten content in the film material has to be at a value of approximately 23 at % tungsten. Therefore, it is possible with the tungsten cluster material to obtain either a high k factor or a temperature coefficient of resistance of 0 or a positive temperature coefficient of resistance. The combination of both properties is not possible.

In contrast, nickel has a relatively low melting point (1,453° C.), so that clusters in a magnitude of a few 10 nm are formed. Nickel has (in the case of spherical or rather approximately spherical clusters) a percolation threshold at approximately 65 at % nickel in the carbon-containing film material. In order to achieve a compensation of the temperature coefficient to 0, only a concentration of the cluster material of approximately 52 at % is necessary. Thus, it is possible in the case of nickel to achieve the combination of high strain sensitivity and a temperature coefficient of 0.

Overall, cluster materials with a melting point of below 1,800° C., preferably in a range of 1,500° C. or below, are advantageous, because in the above-described production process they yield a cluster size between 5 nm and 50 nm that makes it possible to compensate for the negative temperature coefficient of resistance in a sufficiently wide range. In addition, clusters of this cluster size guarantee that the carbon in graphite-like structures will condense as graphene shells around the clusters during the above-described production process.

Thus, when choosing suitable cluster materials for the use of the film resistor as a strain-sensitive material, suitable materials are only those where the necessary concentration of cluster material, which results in a temperature coefficient of 0, is smaller than the concentration of cluster material that results in percolation (percolation threshold).

It would be advantageous for the percolation threshold to be as high as possible, so that there is maximum flexibility for adjusting the temperature coefficient of resistance, for example, for the adjustment of defined positive temperature coefficients. For example, the cluster material should be chosen in such a way that the percolation threshold is 10% or preferably 20% over the concentration of the cluster material, at which a temperature coefficient of resistance of 0 is obtained.

Furthermore, in the course of selecting a suitable cluster material it must be ensured that this cluster material has a positive temperature coefficient that is as high as possible so that it is possible to compensate for the highly negative temperature coefficient of the film material with the smallest possible proportion of cluster material in the film material.

Furthermore, depending on the field of application of the film resistor, the cluster material should be as stable as possible relative to oxidation and other chemical reactions. For example, oxidation would result in a significant change in the electrical conductivity of the film resistor as a whole.

Furthermore, it must be ensured that the chosen cluster material has a low diffusion mobility in the temperature range in which the film resistor is to be used. In particular, the precious metals gold and silver are, therefore, ruled out, because their diffusion mobility in an amorphous carbon matrix or hydrocarbon matrix is too high. Just below the percolation threshold the high diffusion mobility of the cluster materials gold and silver results in the formation of conductive paths, so that the high k factor of the carbon-containing material can no longer take effect. In general, the properties of the film resistor are determined by the properties of the cluster material.

A film resistor with a temperature coefficient of approximately 0 and a high k factor, where both k factor and the temperature coefficient are constant over a wide temperature range, is suitable for pressure measurements and force measurements in many fields of application. Depending on the choice of cluster material, such film resistors can also be used for pressure and/or force measurements in aggressive environments, such as in hydraulic systems.

To this end, it is especially possible to use the film resistor 1 (for example, as depicted in FIG. 1) alone, that is, without a pressure absorbing diaphragm for detection of ambient pressure conditions. The film resistor 1 need only be applied on a non-conducting material and be incorporated into the corresponding pressure environment. Then the change in resistance represents a pressure change, when the temperature coefficient is adjusted to zero in the above-described way.

The invention claimed is:

1. A film resistor (1) comprising a carbon-containing material (3) into which clusters (4) of conductive cluster material are introduced,
    wherein the conductive cluster material has a positive temperature coefficient;
    wherein the clusters (4) are surrounded by a graphite shell and are embedded in the carbon-containing material (3), characterized in that
    the cluster material is present in a thermodynamically stable phase.

2. The film resistor (1) according to claim 1, wherein the proportion of cluster material is selected below the percolation threshold for the cluster material so that total percolation of the clusters in the carbon-containing material does not occur.

3. The film resistor (1) according to claim 1,
    wherein the carbon-containing material exhibits a matrix with amorphous carbon or amorphous hydrocarbon.

4. The film resistor (1) according to claims 1, wherein the cluster material contains metal or a metal alloy, in particular nickel, a nickel alloy, copper, a copper alloy, iron, or an iron alloy, cobalt, or a cobalt alloy.

5. The film resistor (1) according to claims 1, wherein the proportion of cluster material in the carbon-containing film is adjusted in such a way that the temperature coefficient of the film resistor (1) is zero.

6. A method for selecting a conductive cluster material for clusters (4) during the production of a film resistor (1) according to claim 1, in that the clusters (4) are formed by deposition in a PVD process under a reactive atmosphere using a carbon-containing gas, wherein the cluster material is selected based on a predetermined desired temperature coefficient of resistance, in particular a desired temperature coefficient of resistance equal to or greater than zero, so that the proportion of cluster material, at which the desired temperature coefficient is obtained, is below the percolation threshold.

7. The method according to claim 6, wherein the cluster material that is chosen is a material that is chemically inert to air, water, or oil.

8. The method according to claim 6, wherein the cluster material that is chosen is a material with which there is essentially no diffusion motion of the clusters (4) and/or the cluster material in the carbon-containing material.

9. The method for producing a film resistor (1), wherein a PVD process is carried out with a sputtering material on a carrier substrate (11) under a reactive atmosphere of a carbon-containing gas, so that the carbon-containing gas is disassociated, and a carbon-containing film (3), in which clusters (4) of the sputtering material are embedded, is deposited on the carrier substrate (11),
    wherein, while the PVD process is carried out, the carbon-containing film (3) is heated to a predetermined temperature at which the sputtering material or a compound of the sputtering material is produced in a stable phase.

10. The method according to claim 9, wherein during the PVD process the carrier substrate is heated to a temperature below 600° C., in particular, to a temperature between 150° C. and 300° C.

11. The method according to claim 9, wherein the carbon-containing gas has ethane, ethylene, ethene, or ethyne.

12. The method according to claims 9, wherein the concentration of the carbon-containing gas determines the proportion of sputtering material in the carbon-containing film (3), with the concentration of the carbon-containing gas being adjusted in such a way that the clusters (4) of sputtering material in the carbon-containing film (3) are separated from each other by the graphene films.

13. The method according to claim 12, wherein the proportion of sputtering material is selected in such a way that a predetermined temperature coefficient of resistance for the film resistor (1) is obtained.

14. Use of the film resistor according to claim 4 as the sensor layer, wherein a strain-sensitive area is formed by the film resistor (1).

15. A film resistor that can be produced by a method according to claims 9.

* * * * *